(12) United States Patent
Nelson

(10) Patent No.: US 9,503,522 B2
(45) Date of Patent: *Nov. 22, 2016

(54) PARALLEL MIGRATION OF DATA OBJECTS TO CLUSTERED STORAGE

(71) Applicant: NetApp, Inc., Sunnyvale, CA (US)

(72) Inventor: Steven Boyd Nelson, Auburn, WA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,122

(22) Filed: Oct. 30, 2015

(65) Prior Publication Data

US 2016/0057221 A1 Feb. 25, 2016

Related U.S. Application Data

(63) Continuation of application No. 14/134,939, filed on Dec. 19, 2013, now Pat. No. 9,207,873.

(51) Int. Cl.
*G06F 13/12* (2006.01)
*G06F 13/38* (2006.01)
*H04L 29/08* (2006.01)
(Continued)

(52) U.S. Cl.
CPC .......... *H04L 67/1095* (2013.01); *G06F 3/061* (2013.01); *G06F 3/0604* (2013.01); *G06F 3/065* (2013.01); *G06F 3/067* (2013.01); *G06F 3/0614* (2013.01); *G06F 3/0619* (2013.01); *G06F 3/0647* (2013.01); *G06F 3/0665* (2013.01); *G06F 11/00* (2013.01); *H04L 67/1097* (2013.01)

(58) Field of Classification Search
None
See application file for complete search history.

(56) References Cited

U.S. PATENT DOCUMENTS 6,598,174 B1 7/2003 Parks et al.
7,130,941 B2 * 10/2006 Okada ................ G06F 3/0604
710/316
7,231,466 B2 * 6/2007 Okada ................ G06F 3/0604
710/36

(Continued)

FOREIGN PATENT DOCUMENTS

| EP | 1130514 | 9/2001 |
|---|---|---|
| WO | WO 2011/029713 | 3/2011 |
| WO | WO 2013/090640 | 6/2013 |
| WO | WO 2013/152215 | 10/2013 |

OTHER PUBLICATIONS

Edwards et al., "FlexVol: Flexible, Efficient File Volume Virtualization in WAFL", USENIX Annual Technical Conference 2008, pp. 129-142.

(Continued)

*Primary Examiner* — Elias Mamo
(74) *Attorney, Agent, or Firm* — Cooper Legal Group, LLC

(57) ABSTRACT

Data objects can be migrated, while live, to virtualized clustered storage arrays in an efficient manner to allow for efficient transition from non-clustered storage to the virtualized clustered storage arrays. A data migration specification indicates data objects to be migrated and parameters for the migration. The parameters include a source of a data object, a destination of the data object in the virtualized clustered storage arrays, and a transfer space. A migration engine validates and parses the data migration specification. For each unique association of source, destination, and transfer space, the migration engine instantiates a migration process that drives and monitors migration of the corresponding data object. The migration processes operate in parallel for migration of the specified data objects into the virtualized clustered storage arrays.

18 Claims, 9 Drawing Sheets

(51) Int. Cl.
*G06F 3/06* (2006.01)
*G06F 11/00* (2006.01)

(56) References Cited

U.S. PATENT DOCUMENTS

| | | | |
|---|---|---|---|
| 7,636,801 B1 * | 12/2009 | Kekre | H04L 67/1097 709/218 |
| 7,996,679 B2 * | 8/2011 | Hsu | G06F 21/606 713/176 |
| 8,234,464 B2 | 7/2012 | Bish et al. | |
| 2005/0149578 A1 | 7/2005 | Sustman et al. | |
| 2007/0064702 A1 | 3/2007 | Bates et al. | |
| 2011/0066767 A1 | 3/2011 | Hyde et al. | |
| 2014/0046917 A1 * | 2/2014 | Smith | G06F 17/30321 707/696 |

OTHER PUBLICATIONS

Office Action from U.S. Appl. No. 14/134,939, dated Feb. 2, 2015, 1-5.
Office Action from U.S. Appl. No. 14/134,939, dated Jun. 18, 2015, 1-10.
Notice of Allowance and Fee(s) Due from U.S. Appl. No. 14/134,939, dated Oct. 5, 2015, 1-7.

* cited by examiner

US 9,503,522 B2

PARALLEL MIGRATION OF DATA OBJECTS TO CLUSTERED STORAGE

CROSS-REFERENCE TO RELATED APPLICATION

This application is a continuation of U.S. patent application Ser. No. 14/134,939, filed Dec. 19, 2013, and entitled "PARALLEL MIGRATION OF DATA OBJECTS TO CLUSTERED STORAGE," the disclosure of which is incorporated herein by reference in its entirety for all purposes.

BACKGROUND

Embodiments of the inventive subject matter generally relate to the field of data storage, and, more particularly, to migrating data to clustered storage.

Cluster computing aggregates computing devices to provide greater reliability, higher availability of computing resources, and performance gains of throughput, load balancing, etc. Clustering is also being applied to storage solutions. Storage equipment (e.g., hard disk arrays, tape drives, NetApp® v-series open storage controllers, Fiber Channel switches, etc.) can be clustered to also provide gains in reliability, performance, and availability for storage solutions. With NetApp Data ONTAP® 8, NetApp, Inc. leverages virtualization with clustering to provide a unified, flexible, and scalable clustered storage solution. Although NetApp, Inc. already allows pooling of heterogeneous storage devices (e.g., RAID equipment), controllers can be clustered. A virtualization layer conceals the details of the clustering and provides a powerful storage solution with the clustered storage equipment via an elegant and simple interface presented as a single controller or pair of controllers.

BRIEF DESCRIPTION OF THE DRAWINGS

The embodiments may be better understood, and numerous objects, features, and advantages made apparent to those skilled in the art by referencing the accompanying drawings.

FIGS. 4-5 depict example operations for the early phases of the migration process up to the phase where the migration process primarily waits for messages from the storage equipment or a controlling dispatcher (e.g., migration engine). FIGS. 6-7 depict example operations for processing a message received during a migration job.

DESCRIPTION OF EMBODIMENT(S)

The description that follows includes example systems, methods, techniques, instruction sequences and computer program products that embody techniques of the inventive subject matter. However, it is understood that the described embodiments may be practiced without these specific details. For instance, although examples refer to storage controllers, embodiments are not limited to interacting with storage controllers. References to storage controllers within these described examples could be replaced with references to file servers, servers, tape drive controllers, or any other of the various types of storage equipment used in storage virtualization and/or network based storage. In other instances, well-known instruction instances, protocols, structures and techniques have not been shown in detail in order not to obfuscate the description.

Data may be migrated due to an upgrade or modification of hardware and/or software corresponding to the devices that host or access the data. Data migration can be resource intensive and interrupt data availability and/or services that rely on that data. Maintaining accessibility of the data during a migration (i.e., migrating live data) increases the complexity of the migration. A migration engine, as disclosed herein, can migrate live data from various storage technologies to a virtualized clustered storage solution with efficiency and reliability. The migration engine spawns multiple migration processes to perform migration of multiple data objects in parallel. The migration engine distributes the data migration based on migration path exclusivity to insure migration job independence among the migration processes. Each migration process drives its own migration and communicates migration state to allow for recovery by the migration engine if needed.

Figure 1:
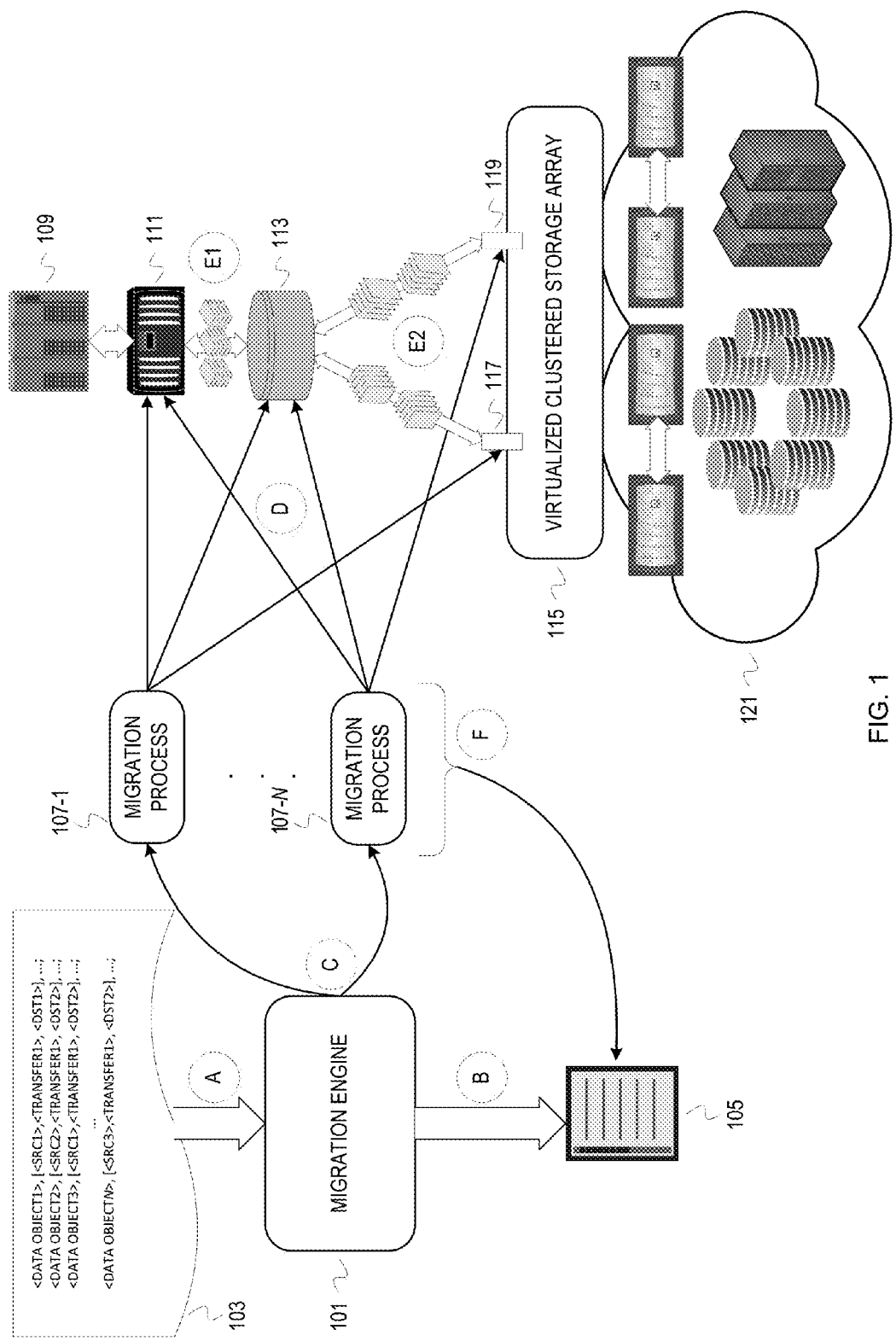
FIG. 1 depicts a diagram of an example distributed, parallel migration of data objects into a virtualized, clustered storage solution.

FIG. 1 depicts a diagram of an example distributed, parallel migration of data objects into a virtualized, clustered storage solution. Data objects in storage devices 109 are to be migrated into a virtualized, clustered storage solution 115. A storage controller 111 provides access to the storage devices 109. A virtualized, clustered storage solution 121 includes storage equipment that can include any number of storage devices (e.g., tape drives, disk drives, etc.), storage controllers, etc. The virtualized, clustered storage solution 121 can implement block based storage (e.g., a storage area network (SAN)), a file based storage system (e.g., network attached storage (NAS)), a combination of SAN and NAS, etc. Regardless of the actual storage technology implemented, the virtualized, clustered storage solution 121 is presented as a virtualized clustered storage array 115. Two virtual storage controllers provide access to the virtualized, clustered storage array 115. The virtual storage controllers interact via logical interfaces. The virtual storage controllers provide information about the logical interfaces to systems requesting access to the virtualized, clustered storage array 115. A logical interface 117 corresponds to one of the virtual storage controllers and a logical interface 119 corresponds to the other virtual storage controller. The virtual storage controllers and virtualized, clustered storage array could instead be presented as virtual storage servers. Operations performed by the systems in FIG. 1 are depicted with labels A to E1-E2, and F. These labels are presented to aid in understanding this particular illustration, and are not to be used to limit the scope of the claims. Despite the sequence of letters used for these labels, the corresponding operations may overlap. For instance, the operations represented by the label F occur through the migration process and do not occur after all of the other labeled operations as possibly suggested by the letters.

A migration engine 101 obtains a job specification or job list 103 at a stage A. The migration engine is an executing instance of program code that handles processing of job lists and dispatches those jobs to migration processes. The migration engine may also implement recovery of aspects of a migration. The job list 103 may be a file loaded into a system hosting the migration engine, a list created from a graphical user interface, etc. Each line in the depicted job list 103 represents a data migration job. In this example, a job is represented by parameters that indicate a data object, a source of the data object, a transfer space for the data object, and a destination in the virtualized, clustered storage array 115 for the data object. The job list 103 can specify other parameters that affect the migration process. The job list 103 identifies migration jobs for data objects 1-N. The parameters of each migration job indicate a data object and a migration path. The migration path is identified by the source, transfer, and destination. The job list 103 indicates that a DATA_OBJECT1 is to be migrated from source SRC1 to destination DST1 via transfer space TRANSFER1. The job list 103 indicates that a DATA_OBJECT2 is to be migrated from source SRC2 to destination DST2 via transfer space TRANSFER1. The job list 103 indicates that a DATA_OBJECT3 is to be migrated from source SRC1 to destination DST2 via transfer space TRANSFER1. The job list 103 indicates that a DATA_OBJECTN is to be migrated from source SRC3 to destination DST2 via transfer space TRANSFER1.

The migration engine 101 processes the job list 103 to create a migration log 105 and instantiate a migration process for each migration job. The migration engine 101 ensures that each indicates job indicates a unique migration path within the job list 103. The migration engine 101 creates the migration log 105 at a stage B. The migration log 105 is used to track state of each migration process that will be instantiated throughout performing the data migration jobs specified by the job list 103. This state information can be used by the migration engine 101 to recover/resume from incidents that prevent any of the migration processes from completing. The migration engine, at stage C, instantiates migration process 107-1 through 107-N. Each migration process works on an exclusive migration path. In other words, the migration processes 107-1 through 107-N will not be migrating data objects over the same migration path. Different migration processes, however, can migrate a same data object over different migration paths.

Each of the migration processes 107-1 through 107-N drives and monitors its migration job at a stage D. "Driving" the migration process involves causing actions to be performed with any one of application programming interface (API) function calls, message based commands (e.g., remote procedure calls), remote login and command line execution, etc. The migration processes 107-1 through 107-N configure a transfer space 113 as an intermediary point for the data migration. Prior to configuration, the transfer space 113 is raw storage space available for the migration. This raw storage space can be separate from the source or on a same storage device as the source. The transfer space may be dynamically allocated or designated for data migrations. The migration processes 107-1 through 107-N communicate with the controller 111 to cause replication of data objects from the storage devices 109 to the configured transfer space 113. The migration processes 107-1 through 107-N communicate with the logical interfaces 117 and 119 to prepare the virtualized, clustered storage array 115 for migration of data from the configured transfer space 113 to the virtualized, clustered storage array 115.

Although the migration processes 107-1 through 107-N drive the migration jobs, the controller 111 and the storage equipment that implements the virtualized clustered storage array 115 and the transfer space 113 carry out the data migration. In accordance with communications/commands from the migration processes 107-1 through 107-N, the controller 111 replicates data to the transfer space 113 at stage E1 Likewise, storage equipment that implements the transfer space 113 replicates data to the virtualized clustered storage array 115 at stage E2 in accordance with the messages/commands from the migration processes 107-1 through 107-N.

Throughout the migration specified by the job list 103, the migration processes 107-1 through 107-N update the migration log 105 as represented by label F. Each of the migration processes 107-1 through 107-N update the migration log 105 to reflect a current state of the particular migration process. The granularity of state maintained in the migration log 105 is based on design of the migration engine that balances performance (e.g., a greater number of states may impact migration performance) against robustness of recovery (e.g., a greater number of states allows for more precise recovery). In addition, the state granularity may be configurable. The migration log 105 is not limited to being used for recovery, and may be used for other purposes, examples of which include troubleshooting and data center analysis.

Figure 2:
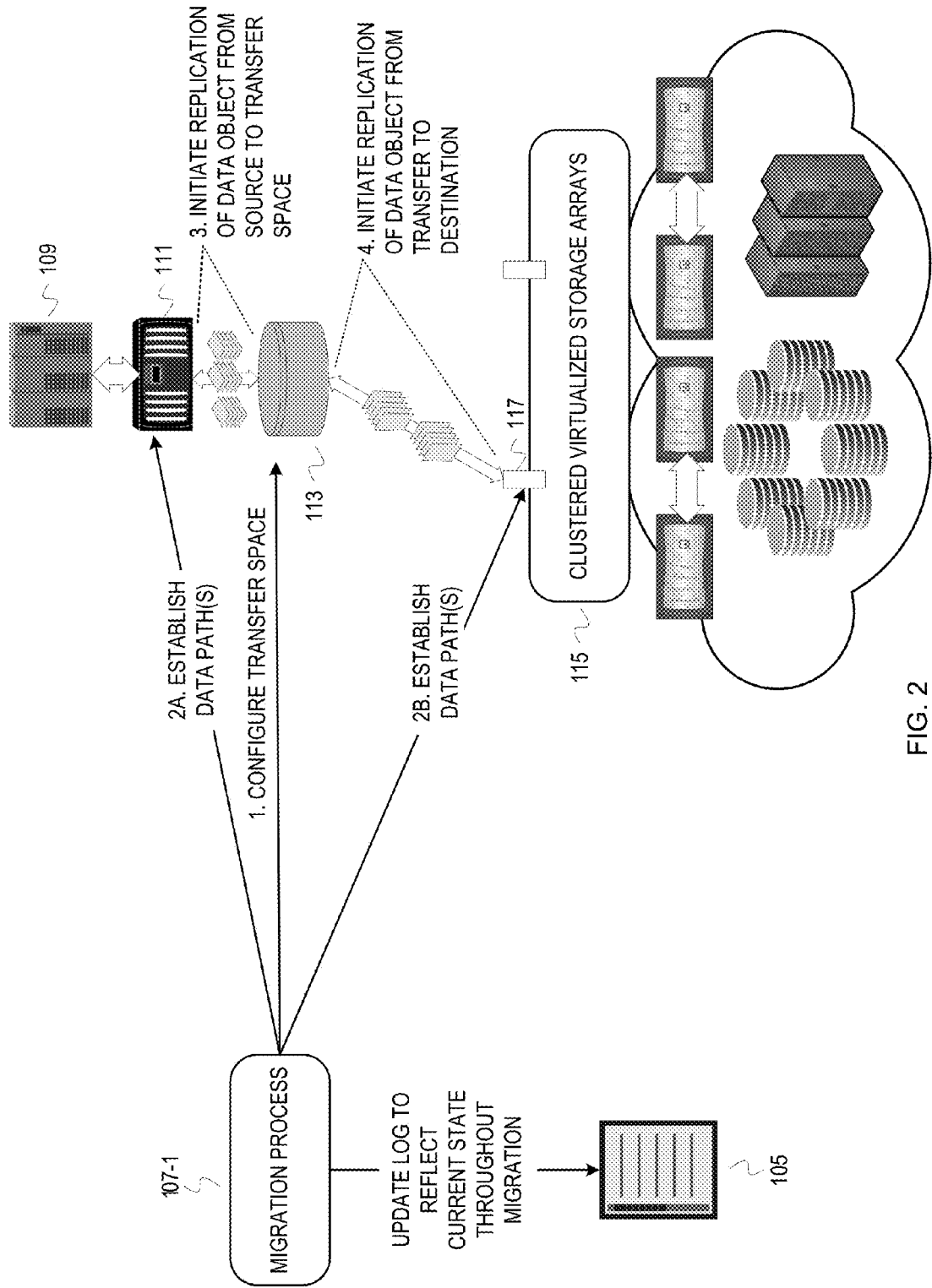
FIG. 2 depicts an example illustration of operations corresponding to the example migration process 107-1 of FIG. 1.

FIG. 2 depicts an example illustration of operations corresponding to the example migration process 107-1 of FIG. 1. These operations are labeled with labels 1-4 to represent time of initiation with respect to the other operations. The migration process 107-1 initially configures the transfer space 113. For example, the migration process 107-1 communicates commands to storage equipment that implements the transfer space 113 to create and mount a volume. The configuration of transfer space allows data to be written into the transfer space.

After the transfer space is configured, the migration process 107-1 establishes data paths for the data migration. FIG. 2 depicts the data path establishment as operations 2A and 2B since the order will vary depending upon implementation. With operation 2A, the migration process 107-1 establishes a data path(s) between the controller 111 and the transfer space 113. With the operation 2B, the migration process 107-1 establishes a data path(s) between the transfer space 113 and the logical interface 117, which can also be referred to as the virtual storage controller within the context of this example illustration. Establishing the data paths results in network stack processes at the end points being instantiated/resumed and structures created/initialized to handle communications of the data migration.

After the data paths are established, the migration process 107-1 initiates replication of the data object from the storage devices 109 via the storage controller 111 to the transfer space 113. The migration process 107-1 initiates replication of the data object in a manner that prepares the data object for replication to the clustered virtualized storage arrays 115. For instance, the migration process 107-1 may pass commands to the controller 111 to replicate decomposed units of the data object (e.g., command the controller 111 to replicate individual directories of a volume). Afterwards, the migration process 107-1 initiates replication of data from the transfer space 113 to the logical interface 117.

As stated in the context of FIG. 1, the migration process 107-1 updates the migration log 105 to reflect current state throughout migration of the data object for which the migration process 107-1 is responsible. The migration process 107-1 can update state after receipt of confirmation that an operation has been performed by any of the targeted storage equipment. The migration process 107-1 can also update state in response to acknowledgements of messages sent to the storage equipment. The migration process 107-1 can write directly to the migration log 105 as depicted in FIGS. 1 and 2. The migration processes can also write state to an event log from which the migration engine pulls information. The migration engine can pull information from the event log to determine whether an action should be triggered (e.g., recovering a migration process). The migration engine can then write state to the migration log 105.

Figure 3:
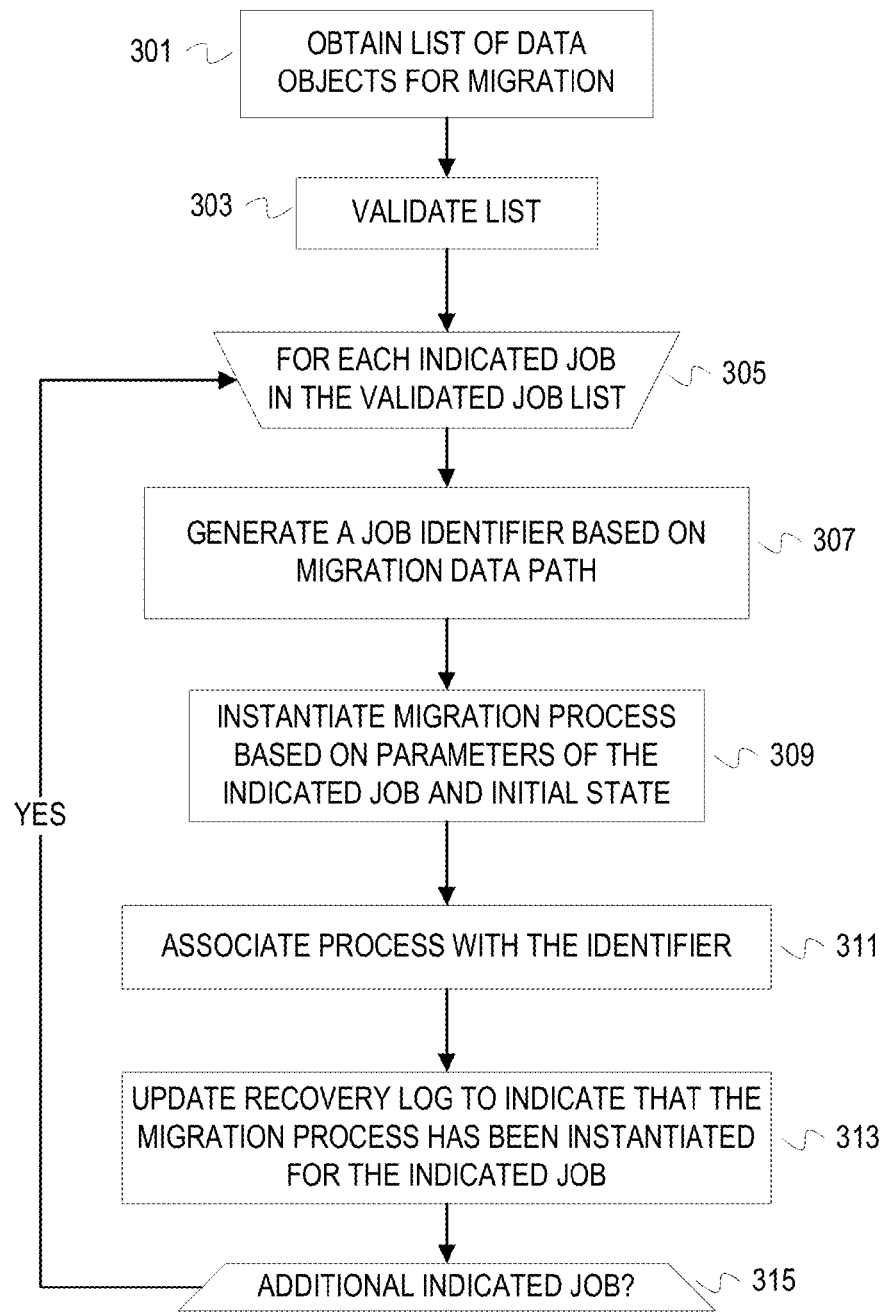
FIG. 3 depicts a flowchart of example operations for processing a migration specification.

FIG. 3 depicts a flowchart of example operations for processing a migration specification. The example operations depicted in FIG. 3 could be performed by a program that embodies the migration engine depicted in FIG. 1. Since a program code can be assigned any of a variety of names and be implemented with various languages and techniques, flowcharts are described without specifying a particular actor since the functionality is not dependent on any particular actor.

At block 301, a list of data objects for migration is obtained. This migration job list may be obtained from a file, from a graphical user interface, from a message, etc. The information that encapsulates the data objects to be migrated is referred to herein as a migration job list or job list, but can be implemented in any of a variety of formats and structures (e.g., an array, a text file, etc.). Indication of the data object to be migrated, the migration data path, and other values/parameters that affect the migration are referred to as a migration job. Examples of the other values/parameters include a logical group, transfer space size for the data migration, resource limitations (e.g., bandwidth allowed), etc. Logical groups can be specified in accordance with an organizations roles, policies, etc. For example, a data object to be migrated may be specified for a legal department as well as an accounting department. These different logical groups likely have different permissions that will be applied to their data objects and, perhaps, the structure(s) or device that hosts the data objects. Different instances of the migration engine can assume responsibility for the different logical groups indicated in a job list.

At block 303, the migration job list is validated. The migration job list is evaluated to determine whether different migration jobs indicate a same data path. If the migration job list indicates a same data path for different migration jobs, then the job list violates the rule that each job have a unique data path relative to the other jobs in the job list. If this rule is violated, then a validating action can be taken. Jobs that repeat data paths can be removed from the job list and written into a new migration job list. The job with the violating data path could be removed and a notification created that the job was not carried because it violated the path exclusivity rule. A validating action can also be changing the specified transfer space in the migration data path. If a different transfer space is available (e.g., a different host or different storage device), a migration engine can modify the migration data path to specify the different transfer space. If the migration job list indicates different logical groups, then a migration engine can create a different instance of the migration engine to handle the different logical group. If the jobs that have the same migration path are in different logical groups, then the migration path exclusivity rule is satisfied by the separation of logical groups into different migration engine instances.

At block 305, a loop begins for each job indicated in the validated list. In this example flowchart, the loop carries out operations of blocks 307, 309, 311, and 313.

At block 307, a job identifier is generated based on the migration data path of the job. For instance, the job identifier can be a concatenation of a source identifier (e.g., volume identifier and source host network address), destination identifier (e.g., destination volume identifier and destination host network address), and transfer space identifier network address. As another example, the job identifier can be generated by computing a hash of the source volume identifier and source host network address, destination volume identifier and host network address, and transfer space network address. The job identifier can be used to identify the migration process that will be instantiated or mapped to the process identifier of the migration process. The job identifier allows the state information of a migration process to resolve back to the corresponding job tasked to the migration process.

At block 309, a migration process is instantiated based on the parameters of the indicated job. The migration job is also instantiated with an initial state to reflect instantiation of the migration process. This state can be written directly into a migration log by a migration engine or passed into the migration process to seed a state engine of the migration process. The migration process can be instantiated on a same machine as that hosting a migration engine, on a different machine, on a machine associated with the transfer space, etc. The migration process can be instantiated with the parameters of the job. The migration process can also be instantiated with a reference (e.g., address, link, or pointer) to a location that hosts the parameters for the migration job. The migration process can access the parameters after being instantiated.

At block 311, the migration process is associated with the job identifier. For example, a migration log is updated to identify the migration process with the job identifier. The migration process may be identified by a thread identifier, process identifier, host address, virtual machine identifier, etc. Whatever identifier used to identify the migration process is mapped to the job identifier.

At block 313, the migration log is updated to indicate that the migration process has been instantiated for the indicated job. This update may be in response to an acknowledgement message from the migration process. For instance, migration program code can be written to accept an identity of a launching process (e.g., a migration engine instance) as a parameter. The migration program code can also be written to provide an acknowledgement to the identified launching process after the parameters have been loaded by the migration process.

At block 315, it is determined whether an additional job is indicated. If all jobs in the validated migration job list have been processed, then the launching process monitors the migration log. If additional jobs remain to be processed, then control flows back to block 305.

Figure 4:
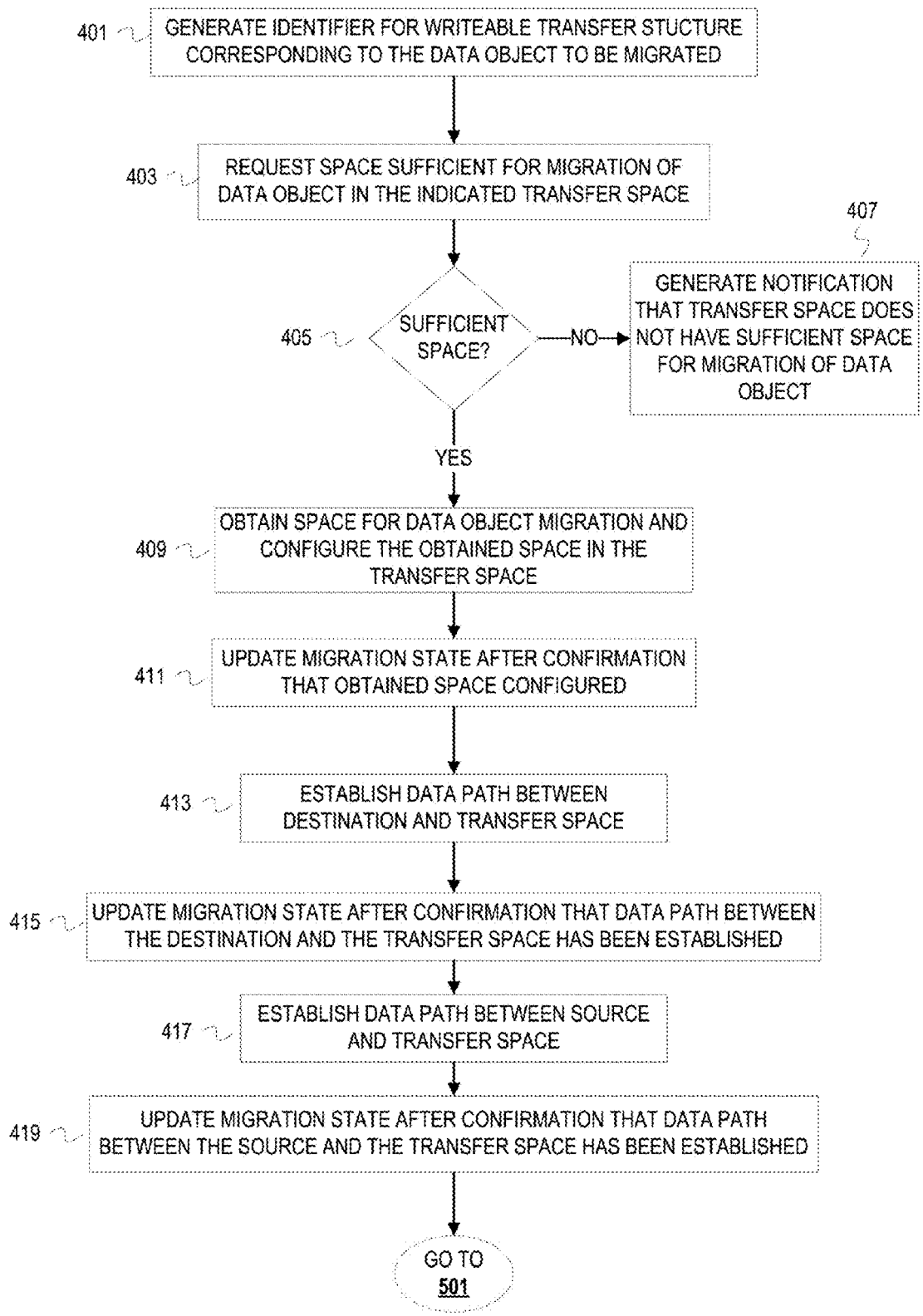
FIGS. 4-7 depict a flowchart of example operations for a migration process.
Figure 5:
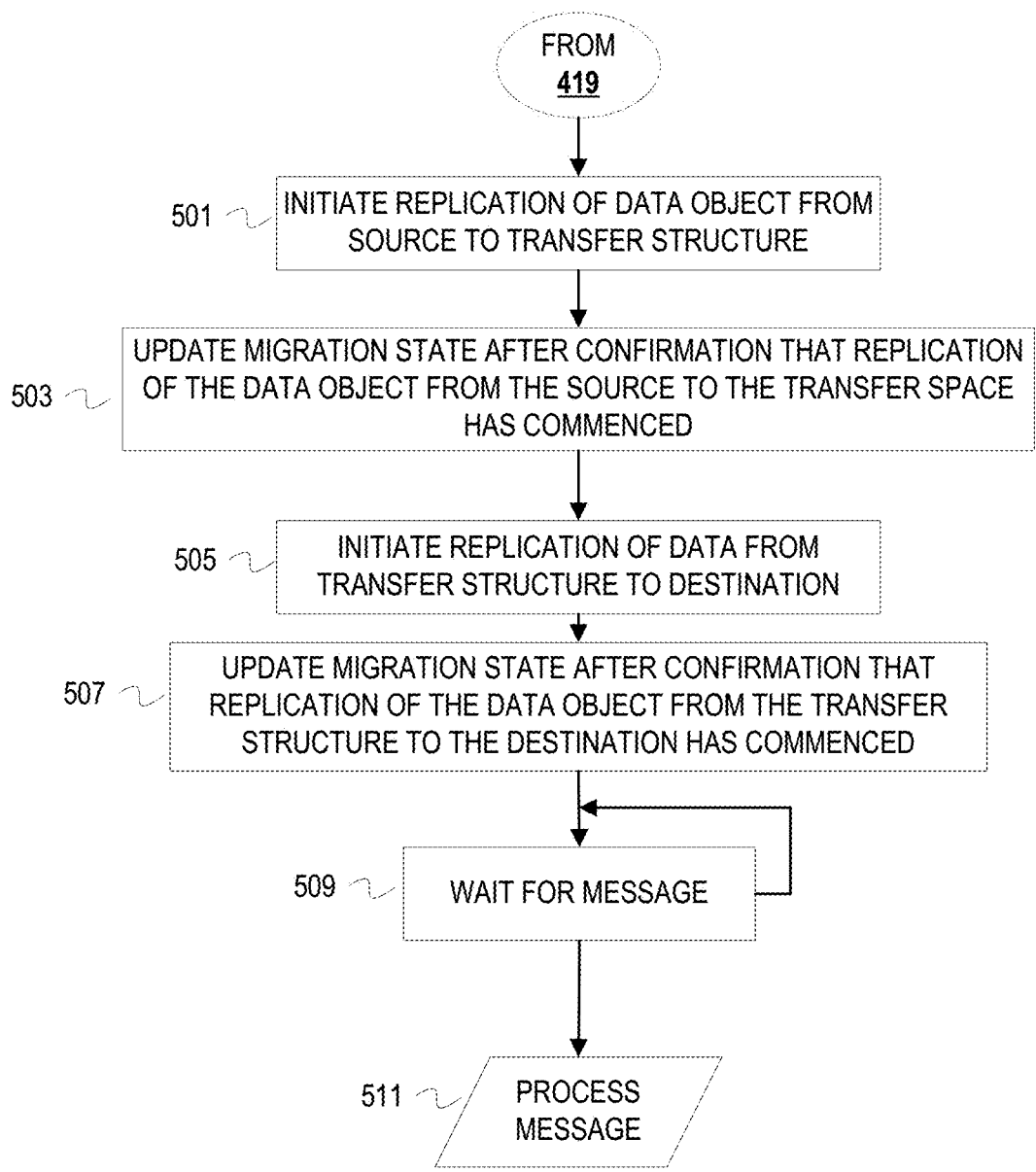
Figure 6:
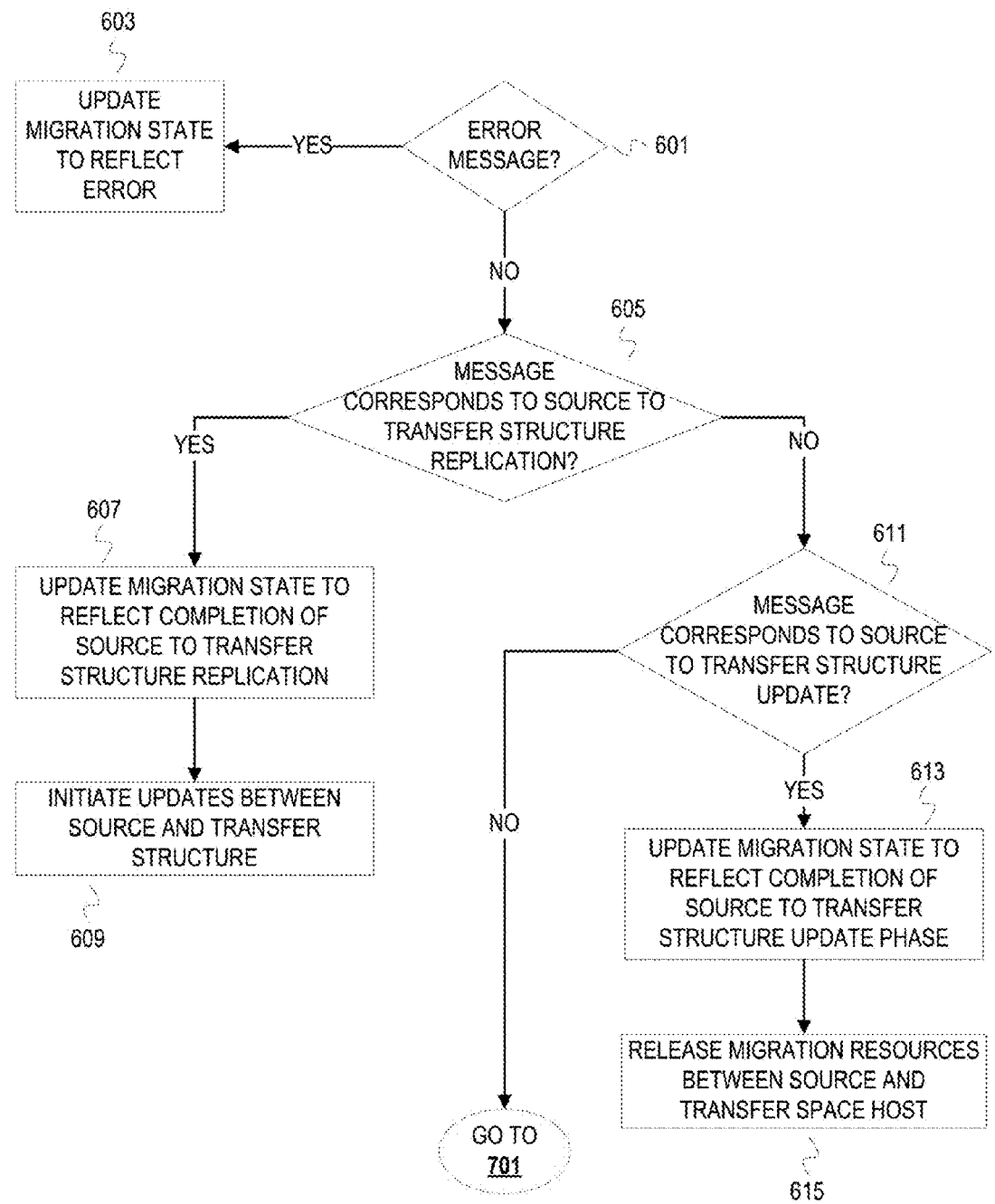
Figure 7:
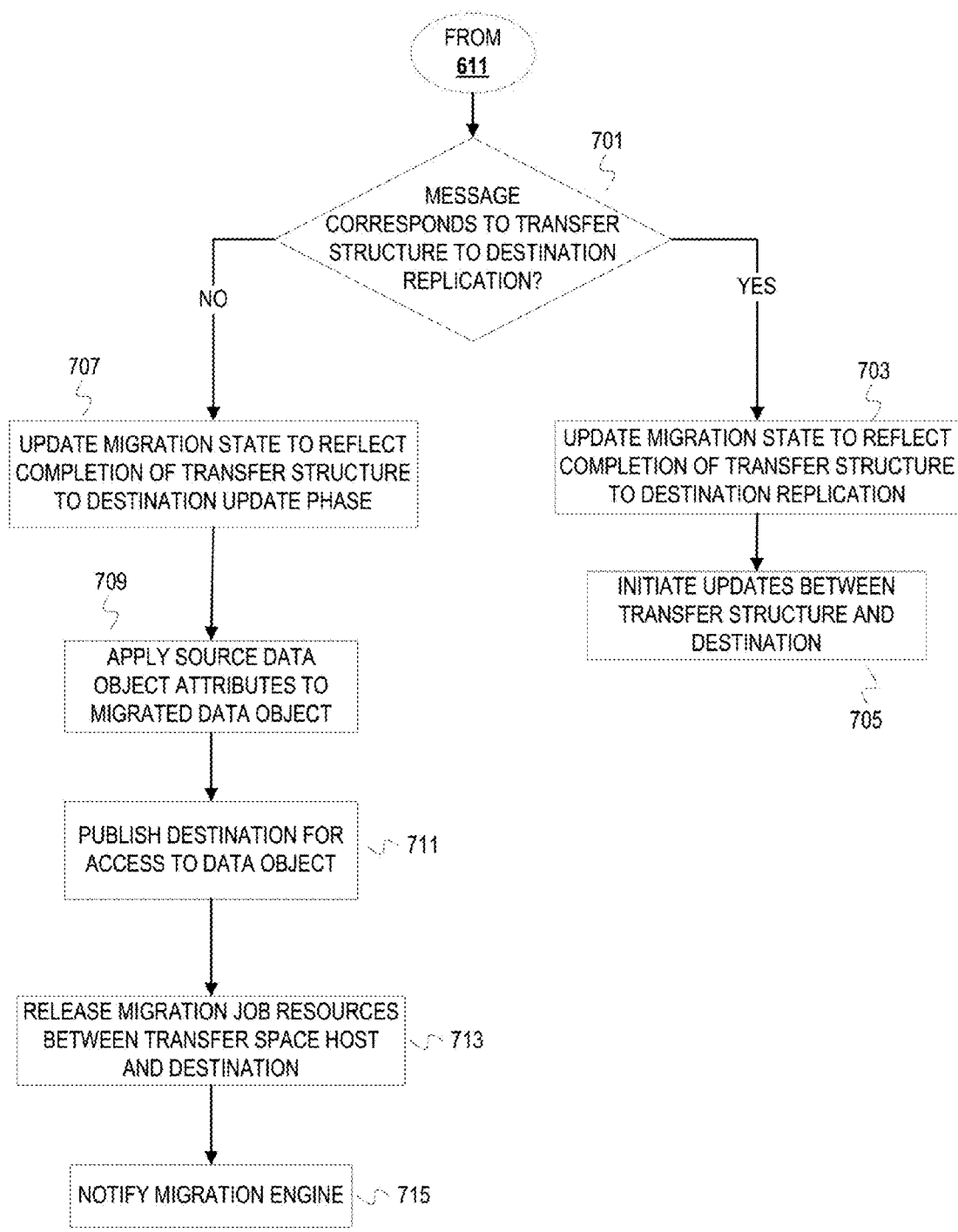

FIGS. 4-7 depict a flowchart of example operations for a migration process. FIGS. 4-5 depict example operations for the early phases of the migration process up to the phase where the migration process primarily waits for messages from the storage equipment or a controlling dispatcher (e.g., migration engine). FIGS. 6-7 depict example operations for processing a message received during a migration job.

At block 401 of FIG. 4, an identifier for a writeable transfer structure corresponding to the data object to be migrated is generated. The writeable transfer structure is a structure that allows data to be written into the transfer space as a result of configuring the transfer space (e.g., creation of boot records and/or partition tables). Although examples refer to creating a volume in the transfer space, embodiments can also create logical disks, partitions, etc. The identifier for the writeable structure can be based on the job identifier (or even be the job identifier). However, embodiments may not generate an identifier for the writeable structure. Embodiments may rely on the storage equipment and software of the transfer space to assign an identifier and communicate that identifier back to the migration process.

At block 403, space sufficient for the migration of the data object in the indicated transfer space is requested. The space to accommodate the data object being transferred may be indicated as a parameter of the migration job. If not, the migration process can query the source of the data object to determine the amount of storage space to accommodate the data object, including control information (e.g., metadata, access structures, etc.) for the data object. A message is sent to the transfer space device requesting allocation of storage space of the amount sufficient for replication of the data object.

At block 405, it is determined whether the transfer space has sufficient space to accommodate the request. If not, then control flows to block 407. If sufficient space is available, then control flows to block 409.

At block 407, a notification is generated that the transfer space does not have sufficient space for the migration of the data object. The notification may be a message sent to a migration engine or job dispatcher. The notification may be reflected in a migration state update. If space is insufficient for migration of the data object, then the job may be eliminated or delayed. Corrective action can be taken to obtain transfer space from different storage equipment or release other storage space that can be cleared/reformatted for use as transfer space. Embodiments can handle the space insufficiency in transfer space differently. A migration engine can suspend all migration processes and take this corrective action before resuming the suspended migration processes. A migration engine can suspend the affected migration process, take corrective action, and restart the migration process. Embodiments can also implement the program code for a migration process to take the corrective action itself.

At block 409, the space for the data object migration is obtained and the obtained space is configured. A migration process, for example, begins sending configuration commands (or directly configures) the transfer space after receiving acknowledgement that the requested space is available in the transfer space.

At block 411, job migration state for the migration job is updated after confirmation has been received that the obtained space has been configured. After sending the configuration commands, the migration process waits for a confirmation for proceeding to a next phase of the migration job. The migration process updates migration state for the migration job to indicate that the transfer space has been configured for the migration job and information for accessing the configured transfer space. A recovery action can commence with the configured transfer space if needed.

At block 413, a data path is established between the destination and the transfer space. Commands are communicated to create communication endpoints at the source and the transfer space to support the migration operations.

At block 415, the job migration state is updated after confirmation that the data path has been established between the source and the transfer space. Migration state could be updated at a finer granularity, for instance after each endpoint is established instead of waiting until both endpoints are established.

At block 417, a data path is established between the transfer space and the destination. Commands are communicated to create communication endpoints at the destination and the transfer space to support the migration operations.

At block 419, the job migration state is updated after confirmation that the data path has been established between the transfer space and the destination. As mentioned earlier, migration state can be updated at different degrees of granularity. Migration state could be updated after each endpoint is established instead of waiting until both endpoints are established. In addition, establishing the data paths may not explicitly be reflected in the job migration state and may be understood when state is updated to indicate that replication has begun. Control flows to block 501 of FIG. 5 from block 419.

At block 501 of FIG. 5, replication of the data object from the source to the transfer structure is initiated. For example, a migration process may send a command for a controller to execute the NetApp SnapMirror® program with parameters communicated by the migration process.

At block 503, the job migration state is updated after confirmation that replication of the data object from the source to the transfer structure has commenced.

At block 505, replication of data from the transfer structure to the destination is initiated. Replication is initiated for the "data" since the data object may not yet have been replicated to the transfer structure. In the case that replication from the transfer structure to the destination is initiated before replication completes from the source to the transfer structure, the replication can be carried out to account for the ongoing changes to the transfer structure. For instance, snapshotting can be implemented to replicate each change from the transfer structure to the destination. A migration process can initially communicate a replicate command from the transfer structure to the destination. The migration process can then communicate a command to perform snapshots until the migration process terminates the snapshotting.

At block 507, the job migration state is updated after confirmation that replication of data from the transfer structure to the destination has commenced.

At block 509, the process waits for receipt of a message. When a message is received, control flows to block 511 for processing of that message.

FIGS. 6 and 7 depict a flowchart of example operations for the message processing represented by block 511. At block 601 of FIG. 6, it is determined whether the message is an error message. If the message is an error message, then control flows to block 603. At block 603, migration state is updated to reflect the error communicated by the error message. If the error message communicates a defined error code, a migration process can index into a function call structure with the defined error code and execute the corresponding function. If the message is not an error message, then control flows to block 605.

At block 605, it is determined whether the message corresponds to the source to transfer structure replication. This can be determined with various techniques. The message can be considered as corresponding to the source to transfer structure replication if the sender is identified with the source network address; if the message includes a phase identifier that represents the source to transfer structure replication; if the message indicates port numbers that correspond to the source and transfer space; if the message indicates a function name or value that relates to the replication program being utilized; etc. If the message corresponds to the source to transfer structure replication, then control flows to block 607. Otherwise, control flows to block 611.

At block 607, job migration state is updated to reflect completion of the source to transfer structure replication.

This presumes that the types of messages corresponding to the source to transfer structure replication consist of an error message and a completion message. The replication functionality implemented by the source may generate additional messages to communicate progress of the replication. Migration program code can account for these additional messages, and update migration state to reflect what each replication message conveys. An implementation can copy the content of progress messages to indicate current state of the migration job. Embodiments can also locally maintain state of replication progress without relaying this progress to the migration state log.

At block 609, updates between the source and transfer structure are initiated. For example, a migration process can communicate a command to the source to implement snapshotting to capture changes to the data object. Since the data object being migrated is live, the data object can be modified during the migration. To capture these changes, each change at the source can be captured and relayed to the transfer structure. Embodiments can also record a history of changes to the data object during the migration process. The migration process can then send the history of changes to be performed by the destination before the destination goes live with the migrated data object.

At block 611, it is determined whether the message corresponds to source to transfer structure updates. As discussed with respect to block 605, the message can be characterized with various techniques. If the message corresponds to the source to transfer structure updates, then control flows to block 613. Otherwise, control flows to block 701 of FIG. 7.

At 613, job migration state is updated to reflect completion of the source to transfer structure update phase. This state update presumes that the update message is sent when the update ends (e.g., snapshotting ends). The updates can be specified to end after a particular time period, a number of updates, etc. Ending of the updates corresponds to switch over from the source to the destination. The source may provide an update message for each snapshot copied to the transfer structure. In that case, the migration process can maintain a local state of the update phase and only convey completion of updates to the migration log. Also, the update message will include information to allow distinction between progress messages and a completion message. The migration process could also be implemented to convey each progress message from the update process to the migration state log.

At block 615, migration resources between the source and transfer space are released. Releasing the resources can include tearing down data path endpoints, terminating communication processes, etc. The migration process may send individual commands to carry out release of individual resources. The migration process may invoke clean up code at the source and/or transfer space responsible for releasing all resources allocated for the data migration.

Control flowed to block 701 of FIG. 7 if the message did not correspond to the source to transfer structure replication or updates. At block 701, it is determined whether the message corresponds to transfer structure to destination replication. As discussed earlier, the purpose of the message can be determined with various techniques. If the message corresponds to the transfer structure to destination replication, then control flows to block 703.

At block 703, job migration state is updated to reflect completion of the transfer structure to destination replication. Similar to block 607, this presumes that the types of messages corresponding to the transfer structure to destination replication consist of an error message and a completion message. The replication functionality implemented by the transfer space host may generate additional messages to communicate progress of the replication. Migration program code can account for these additional messages, and update migration state to reflect what each replication message conveys. An implementation can copy the content of progress messages to indicate current state of the migration job. Embodiments can also locally maintain state of replication progress without relaying this progress to the migration state log.

At block 705, updates between the transfer structure and destination are initiated. For example, a migration process can communicate a command to the transfer space host (or transfer space controller) to implement snapshotting to capture changes to data in the configured transfer space. This would capture the changes streaming into the configured transfer space without waiting for the source to transfer structure phase to complete. Embodiments can also communicate a recorded a history of changes to the data of the transfer structure, and a command for the destination to perform the recorded changes before the destination goes live with the migrated data object.

If the message is determined to be a message corresponding to update between the transfer structure and the destination, then the job migration state is updated at block 707. The job migration state is updated at block 707 to reflect completion of the transfer structure to destination update phase. This state update presumes that the update message is sent when the update ends (e.g., snapshotting ends). The updates can be specified to end when the updates between the source and transfer structure end. The migration process can send a command to the source to notify the transfer space host when the updates end between the source and the transfer structure. The update process run by the transfer space host can then terminate the updates. The transfer space host may provide an update message for each snapshot copied to the destination. In that case, the migration process can maintain a local state of the update phase and only convey completion of updates to the migration log. Also, the update message will include information to allow distinction between progress messages and a completion message. The migration process could also be implemented to convey each progress message from the update process to the migration state log.

At block 709, source data object attributes are applied to the migrated data object. The source data attributes can include read and write privileges, roles, security keys, security preferences, roles, group identifiers, etc. In some cases, the migration job may have specified that the data object was to be split and migrated. When a data object is split into multiple data objects, the attributes of the source data object are applied to the resulting data objects. If multiple source data objects are merged into a single data objects at the destination, the each attribute can be applied individually dependent upon priorities between attributes of the multiple source data objects. For instance, the greater security requirement and more restrictive privileges of the multiple source data objects would be applied to the resulting destination data object.

At block 711, the destination is published to allow access to the migrated data object. For example, a directory is updated to replace an identifier of the source with an identifier of the destination.

At block 713, migration job resources between the transfer space host and the destination are released. Releasing the resources can include unmounting a logical disk or a volume in the transfer space, releasing a partition in the transfer space, terminating a virtual machine running in the transfer space, tearing down data path endpoints, etc. The migration process may send individual commands to carry out release of individual resources. The migration process may invoke clean up code at the transfer space host and/or destination responsible for releasing all resources allocated for the data migration.

At block 715, the migration engine is notified that the migration job has completed.

Figure 8:
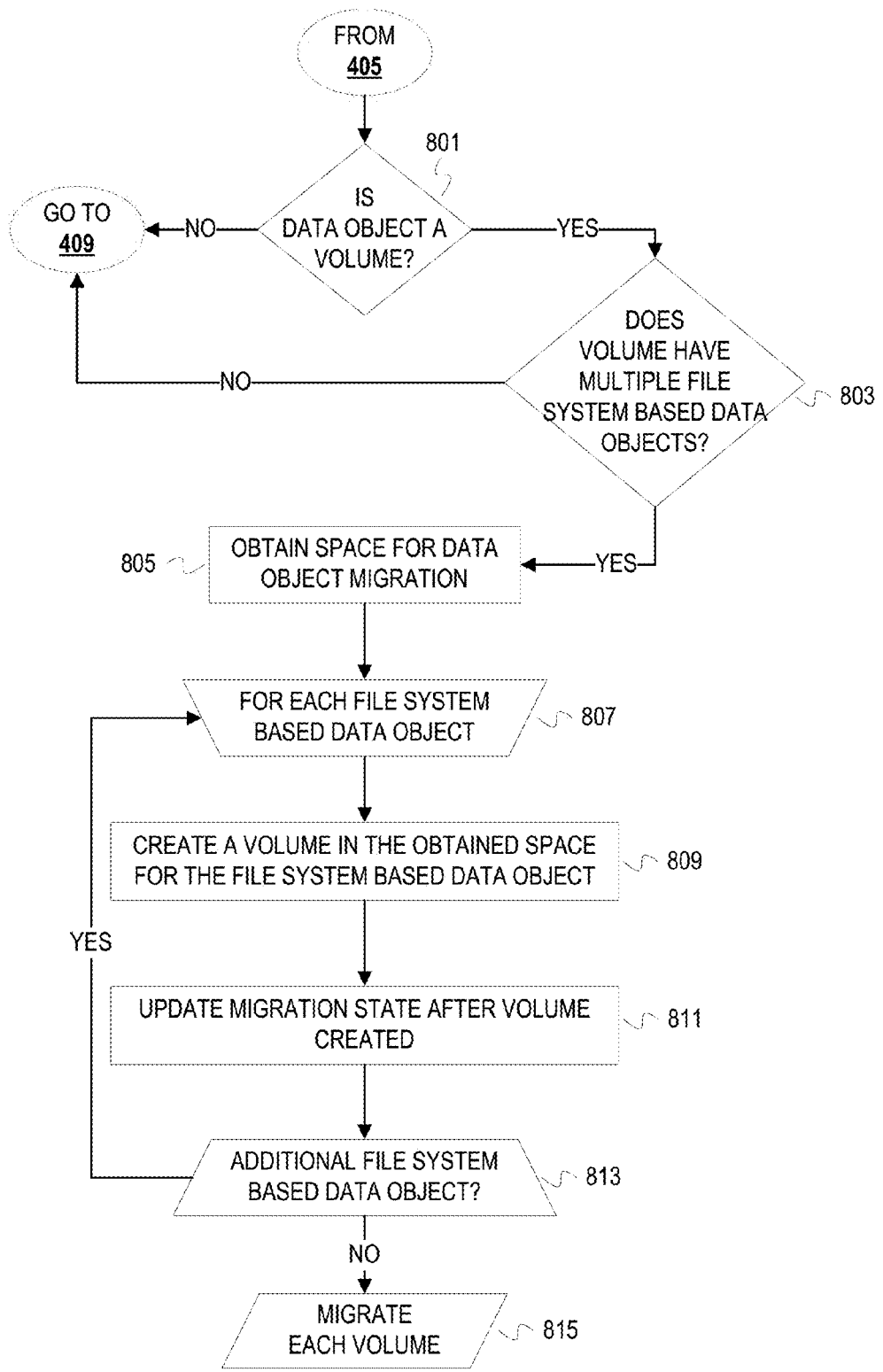
FIG. 8 depicts example operations for a data migration that accounts for decomposing data objects.

Although a virtualized, clustered storage solution can encompass a variety of heterogeneous storage technologies, embodiments may convert data objects being migrated into the virtualized, clustered storage solution. The transfer space can be employed as an intermediate point to migrate the data in a manner suitable for the destination. This allows the data to be migrated into the destination in a uniform manner that can provide greater efficiency in the data migration. For instance, a data object may be a file system based data object, but the destination employs a block based storage system. For example, a qtree can be replicated to a configured transfer space using the qtree mode of NetApp Snap-Mirror technology. A qtree is a subunit of a volume (or FlexVol® virtual volume) that is similar to a partition, although a qtree can be an entire FexVol volume or volume. The qtree is replicated to a volume configured in the transfer space. The volume can then be replicated to the destination using the volume mode of NetApp SnapMirror technology. The source data object may also have to be replicated in decomposed units in cases of data object variation between the source and destination. In addition, decomposed units of the source data object may be more suitable when using available replication technology. The data object can be replicated to the transfer space with a file system based replication process that replicates decomposed units of the data object. And the decomposed units replicated from the transfer space to the destination with a block based replication process. For example, a migration job may identify a volume in a source to be migrated. Instead of replicating the volume, each qtree in the volume is replicated to a different volume in the transfer space. Each volume in the transfer space is then replicated to the destination. FIG. 8 depicts example operations for a data migration that accounts for decomposing data objects. FIG. 8 builds upon the early example operations depicted in FIG. 4. FIG. 8 presumes that control flows from block 405 to block 801.

At block 801, it is determined whether a data object is a volume. If the data object to be migrated is not a volume, then control flows to block 409 of FIG. 4. If the data object is a volume, then control flows to block 803.

At block 803, it is determined whether the volume has multiple file system based data objects. For instance, the volume is accessed to determine whether the volume encompasses qtrees, folders, logical unit numbers (LUNs), or directories, depending upon the hosting technology. If multiple file system based data objects reside within the volume, then control flows to block 805. Otherwise, control flows to block 409.

At block 805, space is obtained in the transfer space for the migration. Computing the space for the migration can go beyond reading the space occupied by the source data object and adding default space for changes that occur during the migration. Computing the space to be configured in the transfer space for the data object migration can involve determining space for each decomposed data object and then adding space sufficient for the separate volumes that will be created for each decomposed data object.

At block 807, a loop begins for each file system based data object (i.e., decomposed data object) in the volume. The loop in this illustration includes operations represented by blocks 809 and 811.

At block 809, a volume is created in the obtained space for the file system based data object. After obtaining a total amount of space for the data object migration, a migration process can begin configuring the obtained space for replication of the file system based data objects.

At block 811, the migration state is updated after the volume is created.

At block 813, it is determined whether an additional file system based object has not been processed. If so, control flows to block 807. If there are no additional file system based data objects in the volume to be migrated, then control flows to block 815.

Block 815 represents a process of migrating each volume. Migrating each volume is similar to the operations represented by block 413 through the rest of the blocks of FIGS. 5, 6, and 7. However, a migration job now consists of multiple replications. A migration process will maintain state for each of the replications. The multiple replications may be able to utilize a single data path. Or multiple data paths will be established for the multiple replications. Although FIG. 8 refers to a volume, embodiments can decompose a data object of other formats, technologies, and/or names that encompass other data objects.

The flowcharts are provided to aid in understanding the illustrations and are not to be used to limit scope of the claims. The flowcharts depict example operations that can vary among embodiments and among implementations of embodiments. Additional operations may be performed; fewer operations may be performed; the operations may be performed in parallel; and the operations may be performed in a different order. For instance, the operation represented by block 401 of FIG. 4 may not be performed. Embodiments can use identifiers generated by the host device or software of the transfer space. An operating system of a machine that hosts a transfer space may automatically generate volume identifiers when volumes are created. Additional operations could be depicted in FIG. 3 to generate identifiers of the transfer structures, thus tasking the migration engine with identifying transfer structures. Furthermore, embodiments are not required to instantiate or launch a migration process for each migration job. Embodiments can leverage processes, threads, etc., that have previously been launched or instantiated and assign migration jobs to those processes or threads.

As will be appreciated by one skilled in the art, aspects of the inventive subject matter may be embodied as a system, method or computer program product. Accordingly, aspects of the inventive subject matter may take the form of a hardware embodiment, a software embodiment (including firmware, resident software, micro-code, etc.) or an embodiment combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The term "computer" as used herein comprises any kind of computing system, machine, or device, including a personal computer, a laptop, a server, a tablet, a smartphone, a smartwatch, etc. A computer can also comprise a computing system that is communicatively coupled with other computer systems to form a set of computing systems that coordinate to perform functions similar to that of a single computing system.

Figure 9:
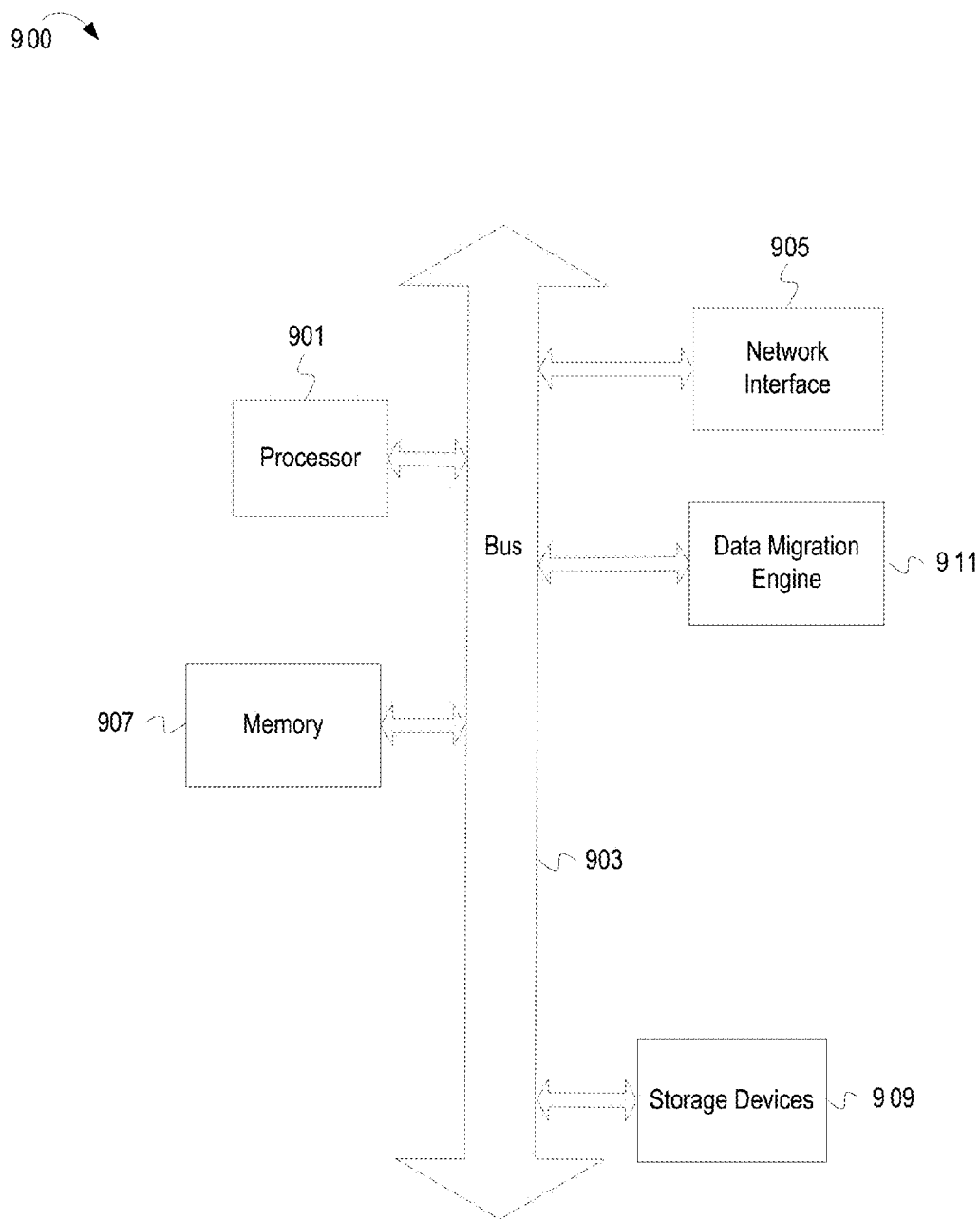
FIG. 9 depicts an example computer system with a data migration engine.

FIG. 9 depicts an example computer system with a data migration engine. A computer system 900 includes a processor unit 901 (possibly including multiple processors, multiple cores, multiple nodes, and/or implementing multithreading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport® bus, NuBus, etc.), a network interface 905 (e.g., an ATM interface, an Ethernet interface, a Frame Relay interface, SONET interface, wireless interface, a Fiber Channel interface, an Infiniband® interface etc.), and a storage device(s) 909 (e.g., optical storage, magnetic storage, etc.). The computer system 900 also includes a data migration engine 911. The data migration engine 911 processes migration specification, validates the migration specification, and assigns a migration job to different processes/threads based on migration path exclusivity as described above. Any one of these functionalities may be partially (or entirely) implemented in hardware and/or on the processing unit 901. For example, the functionality may be implemented with an application specific integrated circuit, in logic implemented in the processing unit 901, in a coprocessor on a peripheral device or card, etc. Further, realizations may include fewer or additional components not illustrated in FIG. 9 (e.g., video cards, audio cards, additional network interfaces, peripheral devices, etc.). The processor unit 901, the storage device(s) 909, and the network interface 905 are coupled to the bus 903. Although illustrated as being coupled to the bus 903, the memory 907 may be coupled to the processor unit 901.

While the embodiments are described with reference to various implementations and exploitations, it will be understood that these embodiments are illustrative and that the scope of the inventive subject matter is not limited to them. In general, techniques for parallel migration of data into a virtualized, clustered storage solution based on migration path exclusivity as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
identifying a plurality of data objects to be migrated via a plurality of migration processes, wherein each of the migration processes is associated with a migration data path that includes a source, a destination, and an intermediate storage, and one of the plurality of data objects; and
for each of the migration processes:
configuring a space in the intermediate storage indicated by the associated migration data path to receive data;
replicating the associated data object from the source indicated by the associated migration data path to the configured intermediate storage space; and
replicating data in the configured intermediate storage space to the destination indicated by the associated migration data path.

2. The method of claim 1 further comprising:
for each of the migration processes, establishing a data path between the source indicated by the associated migration data path and the configured intermediate storage space and establishing a data path between the configured intermediate storage space and the destination indicated by the associated migration data path.

3. The method of claim 1 further comprising:
for each of the migration processes, updating a migration state of the migration process.

4. The method of claim 1 further comprising:
validating data that indicates the plurality of data objects and migration data paths to ensure uniqueness of each of the migration data paths.

5. The method of claim 4, further comprising eliminating or disregarding a data object in the data that is associated with a migration data path that is not unique among the migration data paths.

6. The method of claim 4 further comprising delaying migration of a data object corresponding to a non-unique migration data path.

7. The method of claim 4 further comprising specifying a different intermediate storage in a non-unique migration data path.

8. The method of claim 1, wherein configuring the space in the intermediate storage indicated by the associated migration data path to receive data is in accordance with a parameter associated with the associated migration data path.

9. The method of claim 1, wherein associating the migration data path and a corresponding one of the plurality of data objects with a different migration process comprises instantiating each of the different migration processes.

10. A non-transitory machine readable medium having stored thereon instructions for performing a method comprising machine executable code which when executed by at least one machine, causes the machine to:
identify a plurality of data objects to be migrated via a plurality of migration processes, wherein each of the migration processes is associated with a migration data path that includes a source, a destination, and an intermediate storage, and one of the plurality of data objects; and
for each of the migration processes:
configure a space in the intermediate storage indicated by the associated migration data path to receive data;
replicate the associated data object from the source indicated by the associated migration data path to the configured intermediate storage space; and
replicate data in the configured intermediate storage space to the destination indicated by the associated migration data path.

11. The non-transitory machine readable medium of claim 10, further comprising code to establish a data path between the source and the configured intermediate storage space and establish a data path between the configured intermediate storage space and the destination.

12. The non-transitory machine readable medium of claim 10, further comprising code to update a migration state based on at least one of configuration of the intermediate storage space, replication of the data object from the source to the configured intermediate storage space, and replication of the data in the configured intermediate storage space to the destination.

13. The non-transitory machine readable medium of claim 10, further comprising code to validate data that indicates the plurality of data objects and migration data paths to ensure uniqueness of each of the migration data paths.

14. The non-transitory machine readable medium of claim 13, further comprising code to eliminate or disregard a data object in the data that is associated with a migration data path that is not unique among the migration data paths.

15. The non-transitory machine readable medium of claim 13, further comprising code to delay migration of a data object corresponding to a non-unique migration data path.

16. The non-transitory machine readable medium of claim 13, further comprising code to specify a different intermediate storage in a non-unique migration data path.

17. A computing device comprising:
a memory containing machine readable medium comprising machine executable code having stored thereon instructions for performing a method of parallel migration; and
a processor coupled to the memory, the processor configured to execute the machine executable code to cause the processor to:
identify a plurality of data objects to be migrated via a plurality of migration processes, wherein each of the migration processes is associated with a migration data path that includes a source, a destination, and an intermediate storage, and one of the plurality of data objects; and
for each of the migration processes:
configure a space in the intermediate storage indicated by the associated migration data path to receive data;
replicate the associated data object from the source indicated by the associated migration data path to the configured intermediate storage space; and
replicate data in the configured intermediate storage space to the destination indicated by the associated migration data path.

18. The computing device of claim 17, comprising further machine executable code to cause the processor to establish a data path between the source and the configured intermediate storage space and establish a data path between the configured intermediate storage space and the destination.

* * * * *